United States Patent

[11] 3,552,703

[72] Inventor Bernard M. Ronellenfitch
 400, 209 8th Ave. S.W., Calgary, Alberta, Canada
[21] Appl. No. 707,447
[22] Filed Feb. 23, 1968
[45] Patented Jan. 5, 1971

[54] MEAT HOOK
 11 Claims, No Drawings
[52] U.S. Cl. ................................................. 248/339,
 117/75; 264/134; 117/132
[51] Int. Cl. ........................................................F16b 45/00,
 A22c 15/00, B32b 15/08
[50] Field of Search.......................................... 117/75,
 132B, C, 128.4, 161KP; 248/340, 339, 341

[56] References Cited
 UNITED STATES PATENTS

| | | | |
|---|---|---|---|
| 3,030,249 | 4/1962 | Schollenberger et al. | 117/75X |
| 3,042,545 | 7/1962 | Kienle et al. | 117/75 |
| 3,218,018 | 11/1965 | Pusch et al. | 248/340 |

FOREIGN PATENTS

| | | | |
|---|---|---|---|
| 256,373 | 10/1963 | Australia | 117/75 |

*Primary Examiner*—William D. Martin
*Assistant Examiner*—Ralph Husack
*Attorney*—Stevens, Davis, Miller & Mosher

ABSTRACT: A corrosion-resistant steel meat hook having a primer layer and a cured polyurethane elastomer bonded thereto, said elastomer having sufficient hardness, abrasion resistance and load bearing capacity to resist rupture at the point of suspension.

MEAT HOOK

The present invention relates to a meat hook. In particular the present invention relates to an improved meat hook in which corrosion of the steel forming the meat hook is eliminated and thus contamination by the hook of the meat suspended thereon is eliminated.

Meat hooks for use in transporting meat by rail and road are normally generally S-shaped members formed from mild steel tapering to a point at one end thereof for insertion into the meat. The hooks are suspended by means of the bend therein adjacent the blunt end thereof in eyehooks on rails suspended from the roof of a transport container. Mild steel is subject to corrosion and rusting in the presence of the moisture especially that supplied by the blood of the meat and thus the meat hooks tend to contaminate the meat with undesirable food poisoning occurring. It has, therefore, been common practice to tin the meat hook to eliminate this corrosion and thus avoid contamination of the meat from the hook during its transportation. However, tinning is an expensive process and further it is found on the bend where the hook is suspended from the eye rings, due to the motion of the meat during its transportation, the tin is rubbed away thus exposing the mild steel and once again allowing for the hook to rust and cause discoloration and/or contamination to the meat. It is therefore, the requirement of the U.S. Department of Agriculture that the meat hooks be tinned as is necessary frequently after each trip, which is an expensive process.

Heretofore, attempts have been made to coat the hooks with synthetic resins such as nylon and Teflon but such resins have been found to have insufficient wearing properties such that they rupture at the point of suspension of the meat hook in the eye rings after being in use for a relatively short period of time and in many cases after a single journey necessitating refurbishment of the resin on the hook.

It has now been found according to the present invention that a layer of a fully cured urethane elastomer when fixedly bonded to the surface of the meat hook has sufficient hardness, abrasion resistance and load-bearing capacity to resist rupture at the point of suspension of the hook in the eye ring during long periods of use whereby the meat hook can be repeatedly used without any necessity of refurbishment of the resin.

According to the present invention, therefore, there is provided a steel meat hook provided with a layer of an at least substantially fully cured urethane elastomer fixedly bonded thereto by means of a primer layer said elastomeric layer having a Shore hardness in the range 85A to 78D, an abrasion index in the range 170 to 400 and a load-bearing capacity of at least 1,000 p.s.i.g. without rupture thereof.

Thus, to avoid rupture of the layer of the urethane elastomer it should have a relatively high Shore hardness in the range 85A to 78D and preferably in the range 60D to 67D. Below a Shore hardness of 85A the resin is too soft and will readily rupture. On the other hand above a Shore hardness of about 78D the resin becomes too brittle and will readily crack.

Further, the elastomeric urethane should be highly abrasion resistant and suitably should have an abrasion index according to the Bureau of Standards in the range 170—400 and preferably in the range 225—400. Below an abrasion index of 170 the urethane wears too easily and thus exposes the mild steel and above an index of 400 the resin is again too brittle and readily cracks.

Finally, the urethane elastomer should have a high load-bearing capacity of at least 1,000 p.s.i.g. without rupturing i.e. should have minimum deflection under these loads so as to avoid rupture of the resin at the point from which the meat hook is suspended. Preferably the resin has a load bearing capacity of at least 2,000 p.s.i.g.

The fully cured urethane elastomer is suitably prepared from a prepolymer which in turn is suitably prepared by the reaction of a diisocyanate with a polyester or polyol and preferably a polyol. Thus, the liquid prepolymer is preferably prepared by reacting with heating a diisocyanate with a polyol. The prepolymer is then cured, preferably with a diamine curing agent and more preferably with an aromatic diamine curing agent such as dimethyl aniline and preferably 4,4-methylene-bis(2-chloroaniline). The selection of the diamine curing agent and the prepolymer will depend upon the mechanical properties required in the resultant urethane elastomer and the pot life required for applying a layer of the mixture of prepolymer and curing agent to the meat hook.

A particularly useful urethane elastomer is prepared by curing a polyol diisocyanate prepolymer with about 95 percent of the theoretical of the diamine curing agent and completing the cure with excess moisture in a post curing step. This assures that neither the prepolymer nor the diamines are in excess and this assures that no toxic material is found in the urethane elastomer and thus the elastomer is fully satisfactory to the Food and Drug Administration and, in fact, has been approved by the Food and Drug Administration.

The product is a tough elastomeric nontoxic product having exceptional resistance to abrasion, corrosion and chemical environment. In particular, the polymer is uneffected by oil and grease and is water repellent which are precisely the properties needed when dealing with raw meat.

The urethane elastomer, however, does not bind directly to steel and without such binding the elastomer will readily wear due to movement of the layer relative to the steel. It is, therefore, essential for the present invention that the elastomer is fixedly bonded to the steel and for this purpose a primer coat is applied to the steel before application of the layer of the elastomer. This primer coat is one of the well-known primers including those supplied under trademarks Bondmaster M-344 by Rubber & Asbestos Corp., Bloomfield, N.J.; Chemlock 303, 401 and 607 by Hughson Chemical Co., Erie, Pa., Metalast by C. A. Woolsey Paint & Color Co., Inc. New York, N.Y.; Stanley 40X415 by Stanley Chemical Co., East Berlin, Conn. as well as an epoxy base resin supplied under the trademark Thixon AM, Thixon UM-1 or Thixon XAB-199 by Dayton Chemical Products Laboratories, Inc., which effectively bonds the elastomer layer to the mild steel.

The thickness of the elastomeric urethane layer depends to a great extent on the method of applying the layer to the meat hook and may extend up to ½-inch thickness or more. However, the thinner the layer the less possibility there is of deflection of the elastomeric urethane under load and thus the better its load bearing capacity. The urethane layer may be applied to the meat hook by conventional techniques such as spraying and more preferably open casting as will be shown in the following example.

EXAMPLE

A mild steel meat hook of generally S-shaped configuration tapered at one end to a point is sand blasted and degreased to remove the dust and dirt and subsequently dried. The meat hook is then primed with a solution of 70 parts Thixon XAB-199 in an organic solvent which is a mixture of toluene, Cellosolve acetate (Cellosolve is a trademark) and dimethyl ketone. The primer is applied by brushing or spraying as a wet coat 1½ mils thick which upon drying for 10 minutes in an oven at 212° F. reduces to a ¼-mil thickness. The primed meat hook at 212° F. is then placed at the mold of the open casting unit of a Mark 1-Automatic Process unit supplied by Automatic Process Control of Union, N.J.; A polyurethane prepolymer which is a mixture of 10 percent Adipene 167 prepolymer containing 6.2 percent isocyanate groups and 90 percent Adipene L 315 prepolymer containing 9.25 percent isocyanate groups (Adipene is a trademark) was withdrawn from a drum through a degasser heated to 180° F. and metered into a mixing head. A diamine curing agent supplied under the trademark Mocca by DuPont (4,4-methylene-bis(2-chloroanile)) was heated in a pot to 250° F. and also metered into the mixing head and the mixture poured into the open mold containing the meat hook and the urethane was allowed to cure. The mold was heated at 185—190° F. for 10 minutes to effect such cure and then the resin on the meat hook was post cured in an oven under controlled humidity to complete the curing thereof. The urethane coating upon the meat hook was tough, smooth, elastomeric, nontoxic and showed exceptional resistance to abrasion, corrosion and chemical attack.

In order to further reduce the wear upon the urethane elastomer layer upon the meat hook in a preferred embodiment of the present invention the ring in the transport wagon is also coated in a similar manner with the primer layer and the urethane elastomeric layer which also has the advantage of further reducing any possible contamination of the meat in the container.

The present invention thus also includes in a container for the transportation of meat including rails, rings suspended from said rails and meat hooks suspended from said rings, the improvement in which said meat hooks are provided with a layer of at least substantially fully cured urethane elastomer fixedly bonded thereto by means of a primer layer, said elastomeric layer having a Shore hardness in the range 85A to 78D, an abrasion index in the range 170 to 400 and a load bearing capacity of at least 1,000 p.s.i.g. without rupture thereof. Preferably, as aforesaid, the rings are also provided with the layer of fully cured urethane elastomer fixedly bonded thereto by said primer layer.

I claim:

1. A steel meat hook provided with a layer of at least substantially fully cured polyurethane elastomer fixedly bonded thereto by means of, as a primer layer, an epoxy-based resin, said elastomeric layer having a Shore hardness in the range 85A to 78D, abrasion index in the range 170 to 400 and a load-bearing capacity of at least 1,000 p.s.i.g. without rupture thereof.

2. A hook as claimed in claim 1 in which the polyurethane elastomeric layer has a Shore hardness in the range 60 to 69D in an abrasion index in the range 225 to 400.

3. A hook as claimed in claim 1 having a load-bearing capacity of at least 2,000 p.s.i.g. without rupture thereof.

4. A hook as claimed in claim 1 in which the polyurethane elastomer is the reaction product of a polyol with a diisocyanate.

5. A hook as claimed in claim 1 in which the polyurethane elastomer is a polyester urethane elastomer.

6. A hook as claimed in claim 1 in which the polyurethane elastomer is a diamine cured polyol diisocyanate prepolymer.

7. A hook as claimed in claim 1 in which the polyurethane polyurethane elastomer is an aromatic diamine cured polyol diisocyanate prepolymer.

8. A hook as claimed in claim 1 in which the polyurethane elastomer is a dimethyl amine cured polyol diisocyanate prepolymer.

9. A hook as claimed in claim 1 in which the polyurethane elastomer is a polyol diisocyanate prepolymer cured with 4,4-methylene-bis(2-chloroaniline).

10. A hook as claimed in claim 1 in which the thickness of the polyurethane elastomeric layer is up to one-half inch.

11. A hook as claimed in claim 1 which is of generally S-shaped configuration, tapering at one end to a point for insertion into the meat.